United States Patent
Kang

(10) Patent No.: US 10,366,348 B2
(45) Date of Patent: Jul. 30, 2019

(54) ALGORITHM AND METHOD FOR DETECTING ERROR DATA OF MACHINE BASED ON MACHINE-LEARNING TECHNIQUE

(71) Applicant: Ulala Lab. Inc., Anyang-si, Gyeonggi-do (KR)

(72) Inventor: Hak Ju Kang, Anyang-si (KR)

(73) Assignee: ULALA LAB, INC., Anyang-si Gyeonggi-Do (KR)

( * ) Notice: Subject to any disclaimer, the term of this patent is extended or adjusted under 35 U.S.C. 154(b) by 20 days.

(21) Appl. No.: 15/703,644

(22) Filed: Sep. 13, 2017

(65) Prior Publication Data

US 2019/0050752 A1     Feb. 14, 2019

(30) Foreign Application Priority Data

Aug. 10, 2017 (KR) .......................... 10-2017-0101433

(51) Int. Cl.
| | | |
|---|---|---|
| *G06N 20/00* | (2019.01) | |
| *G05B 23/02* | (2006.01) | |
| *G06F 16/00* | (2019.01) | |
| *G06F 11/07* | (2006.01) | |

(52) U.S. Cl.
CPC ......... *G06N 20/00* (2019.01); *G05B 23/0235* (2013.01); *G06F 11/0703* (2013.01); *G06F 16/00* (2019.01)

(58) Field of Classification Search
CPC .. G06N 99/005; G06N 20/00; G06F 11/0703; G06F 17/30; G05B 23/0235
See application file for complete search history.

(56) References Cited

U.S. PATENT DOCUMENTS

| | | | |
|---|---|---|---|
| 2005/0102426 A1 | 5/2005 | Hamm et al. | |
| 2014/0182548 A1* | 7/2014 | Thompson | G01M 15/11 123/406.19 |
| 2015/0006972 A1* | 1/2015 | Jones | G06F 11/076 714/47.2 |
| 2015/0363699 A1* | 12/2015 | Nikovski | G06N 99/005 706/58 |
| 2016/0202693 A1* | 7/2016 | Noda | G05B 23/0283 702/183 |
| 2017/0139398 A1* | 5/2017 | Tsuzuki | G05B 19/406 |

FOREIGN PATENT DOCUMENTS

| | | | | |
|---|---|---|---|---|
| JP | 2014229176 A | * | 12/2014 | ....... G06Q 10/06315 |
| KR | 20130061029 A | * | 6/2013 | ............. G06Q 50/10 |
| KR | 20160067510 A | * | 6/2016 | ......... G01R 31/3679 |
| KR | 101651104 B1 | * | 8/2016 | ............. G06Q 50/10 |
| WO | 2013113379 A1 | | 8/2013 | |

OTHER PUBLICATIONS

European Search Report of EP Application No. 17190197.8 dated Apr. 25, 2018.

* cited by examiner

*Primary Examiner* — Eric Nilsson
(74) *Attorney, Agent, or Firm* — Dinsmore & Shohl LLP; Yongsok Choi

(57) ABSTRACT

According to the present disclosure, time-sequential threshold data can be automatically detected by a server and thus can be compared with operation data in all of time domains. Therefore, it is not necessary for an operator to input threshold data by hand. Further, according to the present disclosure, it is possible to precisely detect an error of a machine or a defect of a product which has not been conventionally recognized at the time of setting a threshold (absolute value).

15 Claims, 12 Drawing Sheets

ALGORITHM AND METHOD FOR DETECTING ERROR DATA OF MACHINE BASED ON MACHINE-LEARNING TECHNIQUE

CROSS-REFERENCE TO RELATED APPLICATION

This application claims the benefit under 35 USC 119(a) of Korean Patent Application No. 10-2017-0101433 filed on Aug. 10, 2017, in the Korean Intellectual Property Office, the entire disclosures of which are incorporated herein by reference for all purposes.

TECHNICAL FIELD

The present disclosure relates to an algorithm and method for detecting error data of a machine based on a machine-learning technique.

BACKGROUND

With the rapid penetration of the Internet and the development of technology of connecting all of the Internet-based things, the fourth industrial revolution has emerged. One of various technological fields leading the fourth industrial revolution is a technology related to smart factories.

The term "smart factory" refers to the general technology that enables machines and facilities in a factory to be connected and easily managed. One of those technologies for smart factory is a technology of managing machines. That is, it is a technology of managing machines by monitoring whether machines are normally operated and predicting the occurrence of error.

Conventionally, in order to predict a malfunction of a machine, a threshold defined as an absolute value irrelevant to time is set and operation data of the machine are frequently collected, and if any operation data deviate from the threshold, it is determined that a specific error occurs. Conventionally, the threshold is a predetermined allowable value for the machine for production. In other words, the threshold is a combination of operational upper and lower limits to avoid producing defective products. Further, conventionally, the existing threshold is a fixed value directly set by an operator in the factory (i.e., an absolute value fixed in each range set by the operator regardless of time). Therefore, if the operator wants to lower a defect rate by lowering the quality of products, he/she just needs to extend the range of upper and lower limits of the threshold and in the inverse case, he/she just needs to narrow the range of upper and lower limits of the threshold. In addition, the threshold is set for a time section in which products are produced during a period corresponding to a single operational cycle of the machine, but a separate threshold is not set for a time section irrelevant to the production of products. Therefore, even though it is possible to determine whether a product has a defect, it is difficult to accurately determine whether the machine has encountered an error or not.

SUMMARY

In view of the foregoing, the present disclosure is intended to address the issues by automatically extracting time-sequential threshold data from operation data of a machined collected in real time based on a machine-learning technique and thus precisely predict and detect error data of the machine which have not been recognized since an operator sets a threshold by hand.

Furthermore, the present disclosure is intended to enable error data which deviate from time-sequential threshold data to be easily checked on an operator device.

According to an aspect of the present disclosure, a method for detecting error data of a machine based on a machine-learning technique may include: (a) collecting time-sequential operation data of at least one machine; (b) dividing the operation data at a predetermined time interval and mapping the divided operation data to be overlapped on the same time domain; (c) generating time-sequential threshold data by deriving time-sequential standard data for a set of the mapped operation data based on a machine-learning technique; and (d) if operation data collected in real time deviate from the threshold data, determining the data as an error event, and supplying information about the error event to an operator device.

Further, according to another aspect of the present disclosure, a server configured to detect error data of a machine based on a machine-learning technique may include: a memory that stores a program configured to detect the error data of the machine based on the machine-learning technique; and a processor configured to execute the program, and upon execution of the program, the processor collects time-sequential operation data of at least one machine, divides the operation data at a predetermined time interval and maps the divided operation data to be overlapped on the same time domain, generates time-sequential threshold data by deriving time-sequential standard data for a set of the mapped operation data based on the machine-learning technique, and if operation data collected in real time deviate from the threshold data, determines the time-sequential operation data as an error event and supplies information about the error event to an operator device.

According to the present disclosure, time-sequential threshold data can be automatically detected by a server and thus can be compared with operation data in all of time domains. Thus, it is possible to precisely detect an error of a machine or a defect of a product which has not been conventionally recognized at the time of setting a threshold (absolute value).

Therefore, the present disclosure makes it possible to more precisely check products and quality for detects and thus enables precise preventive maintenance.

Further, a threshold is time-sequentially generated for all of time domains with precision. Thus, the accuracy in detecting a defect and malfunction of a machine or product is highly increased. Therefore, the process capability index (Cp) of the machine can be highly improved and can be precisely detected.

Furthermore, a user interface of an operator device is configured to enable the operator to check the status of each machine very easily. Thus, the convenience for the operator can be improved.

BRIEF DESCRIPTION OF THE DRAWINGS

In the detailed description that follows, embodiments are described as illustrations only since various changes and modifications will become apparent to those skilled in the art of the related field from the following detailed description. The use of the same reference numbers in different figures indicates similar or identical items.

DETAILED DESCRIPTION

Figure 1:
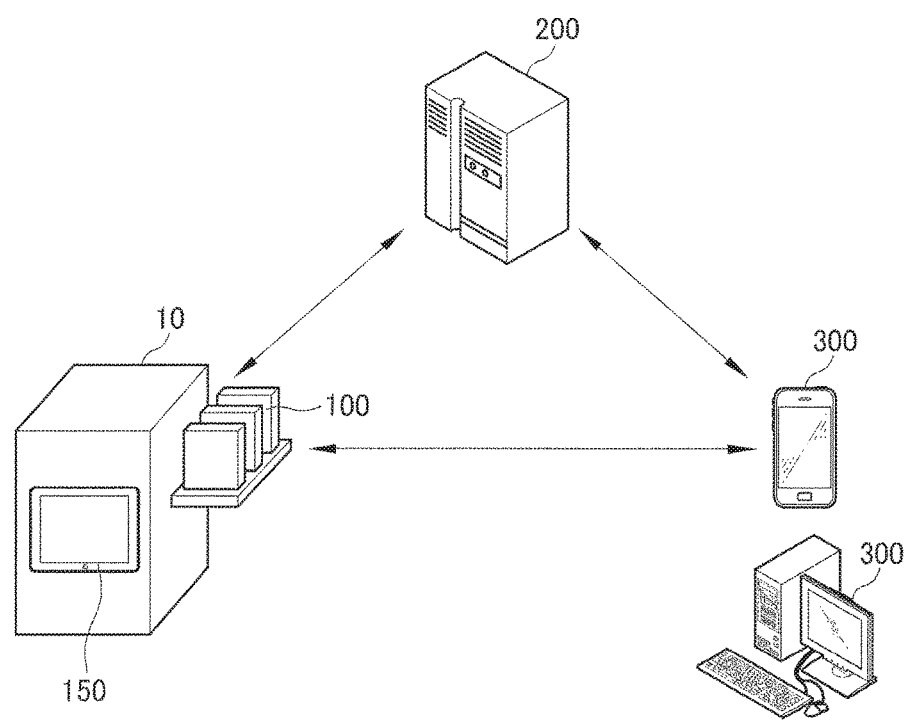
FIG. 1 is a configuration view of a system in accordance with an exemplary embodiment of the present disclosure.

Hereinafter, embodiments of the present disclosure will be described in detail with reference to the accompanying drawings so that the present disclosure may be readily implemented by those skilled in the art of the related field. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "unit" includes a unit implemented by hardware, a unit implemented by software, and a unit implemented by both of them. One unit may be implemented by two or more pieces of hardware, and two or more units may be implemented by one piece of hardware. However, "the unit" is not limited to the software or the hardware and may be stored in an addressable storage medium or may be configured to implement one or more processors. Accordingly, "the unit" may include, for example, software, object-oriented software, classes, tasks, processes, functions, attributes, procedures, sub-routines, segments of program codes, drivers, firmware, micro codes, circuits, data, database, data structures, tables, arrays, variables and the like. The components and functions provided by "the units" can be combined with each other or can be divided. Further, the components and "the units" may be configured to implement one or more CPUs in a device or a secure multimedia card.

A "device" to be described below may be implemented with computers or portable devices which can access a server or another device through a network. Herein, the computers may include, for example, a notebook, a desktop, a laptop, and a VR HMD (e.g., HTC VIVE, Oculus Rift, GearVR, DayDream, PSVR, etc.) equipped with a WEB browser. For example, the portable devices are wireless communication devices that ensure portability. Herein, the VR HMD includes all of models for PC (e.g., HTC VIVE, Oculus Rift, FOVE, Deepon, etc.), mobile (e.g., GearVR, DayDream, Baofeng Mojing, Google Cardboard, etc.) and console (PSVR), and stand-alone models (e.g., Deepon, PICO, etc.). The portable devices are, for example, wireless communication devices that ensure portability and mobility and may include a smart phone, a tablet PC, a wearable device and various kinds of devices equipped with a communication module such as Bluetooth (BLE, Bluetooth Low Energy), NFC, RFID, ultrasonic waves, infrared rays, WiFi, LiFi, and the like. Further, the term "network" refers to a connection structure that enables information exchange between nodes such as devices, servers, etc. and includes LAN (Local Area Network), WAN (Wide Area Network), Internet (WWW: World Wide Web), a wired or wireless data communication network, a telecommunication network, a wired or wireless television network, and the like. Examples of the wireless data communication network may include 3G, 4G, 5G, 3GPP (3rd Generation Partnership Project), LTE (Long Term Evolution), WIMAX (World Interoperability for Microwave Access), Wi-Fi, Bluetooth communication, infrared communication, ultrasonic communication, VLC (Visible Light Communication), LiFi, and the like, but may not be limited thereto.

Hereinafter, the term "operation data" refers to data directly or indirectly showing the operation of a machine and may include, for example, the temperature, humidity, pressure, and electric power of the machine.

Further, the term "object" refers to a component produced at a factory or a sub-component thereof and refers to what is manufactured/produced by a single machine.

Furthermore, the term "error data" refers to data about at least one of errors of a machine and defects of an object manufactured by the machine.

Referring to FIG. 1, a system according to an exemplary embodiment of the present disclosure includes a sensor assembly 100, a worker device 150, a server 200, and a manager device 300 provided near a machine 10 within a factory. Herein, the worker device 150 may refer to a device assigned to a worker in charge of any one process in lines installed in the factory, and the manager device 300 may refer to a device assigned to a manager of the lines or factory. The worker device 150 and the manager device 300 may be collectively called operator devices.

The system according to an exemplary embodiment of the present disclosure may provide a smart factory service. The smart factory service can provide the efficiency and convenience in managing the machine 10 to the manager by monitoring an operation status of the machine 10 in the factory in real time and if a malfunction is highly likely to occur or occurs, immediately reporting the malfunction to the manager. Particularly, an IoT (Internet of Things)-based service is provided through the sensor assembly 100, and, thus, it is possible to eliminate the factory manager's inconvenience of checking each machine 10 in detail. Further, threshold data are automatically set by the server through machine learning to values measured by the sensor assembly 100, and, thus, it is possible to precisely determine whether there is an abnormality in the machine or products.

The sensor assembly 100 is an IoT integrated module device including at least one sensor. The sensor assembly 100 is provided near the machine 10 in the factory and may be attached to any one of surfaces of the machine 10. The sensor assembly 100 includes a sensor configured to measure operation data of the machine 10 and a sensor configured to transmit the operation data to the server 200.

Figure 2:
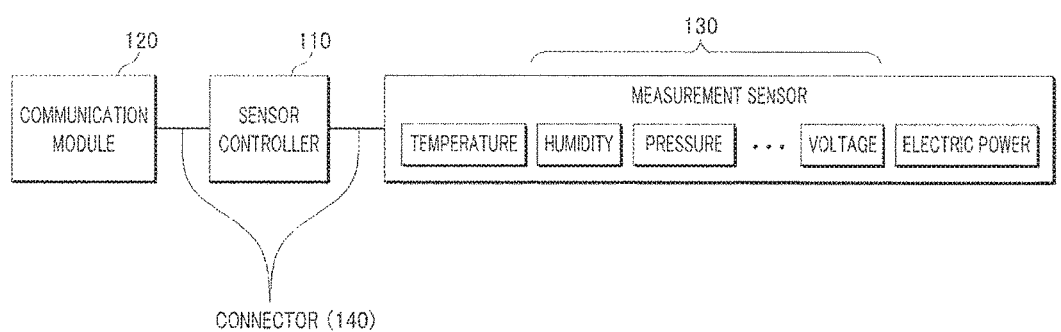
FIG. 2 is a block diagram for a structure of a sensor assembly in accordance with an exemplary embodiment of the present disclosure.

Specifically, referring to FIG. 2, the sensor assembly 100 includes a sensor controller 110, a communication module 120, a measurement sensor 130, and connectors 140.

The sensor controller 110 to measurement sensor 130 may be implemented as components physically separate from each other. That is, as illustrated in FIG. 1, each of the sensors may be formed into a hexahedral shape with physically similar or identical dimensions and can be very easily replaced for each module if necessary. For example, if any one of the sensor controller 110, the communication module 120, and the measurement sensor 130 breaks down or needs to be changed in usage, the problem can be easily solved by replacing that sensor. The sensor assembly 100 may further include a stand. The stand functions to support the sensor controller 110 together with the communication module 120. The stand has the area enough to cover the area of the sensor controller 110 and the communication module 120 and includes partition walls on its edges and thus may also function to fix the sensor controller 110 and the communication module 120 so as not to deviate to the outside. In this case, the sensor controller 110 and the communication module 120 may be arranged as being stacked on the stand.

The sensor controller 110 is configured to receive an electric signal value (current or voltage value) measured by the measurement sensor 130 from the measurement sensor 130 and transfer the electric signal value to the communication module 120 so as to be transmitted to and collected by the server 200. Herein, the sensor controller 110 is connected to at least one measurement sensor 130. Even if the existing measurement sensor 130 connected to the sensor controller 110 is replaced by another measurement sensor 130 via replacement or addition of the measurement sensor 130, the sensor controller 110 may receive an electric signal value from the measurement sensor 130 currently connected thereto and recognize the electric signal value.

The sensor controller 110 may be connected to various sensors such as a temperature sensor, a pressure sensor, a humidity sensor, a current/voltage sensor, an electric power sensor, and the like. Further, in the case where the server 200 is equipped with firmware, the sensor controller 110 simply functions to transfer an electric signal value from the measurement sensor 130 (i.e., A/D signal value: signal converted from analog to digital) to the server 200. In the case where firmware for all of the sensors is downloaded and installed in the sensor controller 110, even if the sensors are not compatible with each other, the sensor controller 110 can recognize a signal from the corresponding sensor.

The sensor controller 110 is configured to convert operation data received from the measurement sensor 130 into a normalized digital signal and then transfer the normalized digital signal to the communication module 120. For example, signals transferred from the temperature sensor and the pressure sensor to the sensor controller 110 may be electric signals of different formats. If these signals are transferred to the server 200 as they are, the server 200 may not accurately recognize information therein. Therefore, the sensor controller 110 may also function to covert an analog signal or digital signal into a normalized digital signal to be recognized by the server 200.

The communication module 120 may function to transfer information between the sensor controller 110 and the server 200 or the manager device 300. The electric signals transmitted to the server 200 by the communication module 120 may be recognized as operation data by firmware stored in the server 200. That is, although the electric signals are transmitted as simple current value or voltage value to the server 200, these signals can be recognized as values relevant to operation data such as temperature, pressure, humidity, and the like since the firmware is present in the server 200.

The measurement sensor 130 is configured to measure operation data of the machine 10. For example, the measurement sensor 130 may be a sensor configured to measure any one of the temperature, pressure, humidity, voltage, electric power, and vibration. This is just an example, and the measurement sensor 130 may include a sensor configured to measure various other operation data.

The sensor controller 110, the communication module 120, and the measurement sensor 130 may be connected and fixed to each other through the connectors 140. The connectors 140 may be implemented as electric wires or lines. Otherwise, the connectors 140 may be implemented as multiple pins formed in a region of each of the sensors, respectively. If the connectors 140 are implemented as pins, the connectors 140 formed in the respective sensors are arranged and connected to be engaged with each other, and, thus, the sensors can be connected to each other. Further, if the connectors 140 are provided as being fixed and connected to each other, it is possible to connect the connectors 140 to each other and also possible to fix the relative positions of the sensors.

The server 200 may receive electric signal values relevant to operation data of the machine 10 from the sensor assembly 100 provided in each machine 10 and recognize which operation data relevant to the electric signal values based on firmware. Further, the server 200 may automatically generate time-sequential threshold data of the machine based on operation data collected via big data analysis and machine learning-based analysis, and, thus, the operator does not need to input threshold data corresponding to absolute values by hand. Further, since the threshold data are based on machine learning, it is possible to precisely set thresholds and thus possible to precisely determine an error of the machine or a defect of a product.

Information about the operation data in the server 200 may be provided to the worker device and the manager device.

The worker device 150 is a device provided in the machine 10 or arranged near the machine 10 and configured to display real-time operation data of the machine 10 and thus enables a worker in charge of a process to directly monitor and check the current status of the machine 10.

The manager device 300 may be equipped with an application configured to provide the smart factory service. The application may receive information from the server 200, process the information into a format easy for the user to understand, and supply the information about the operation status of the machine 10 to the user and display operation data of all of the machines 10 in the factory so as to be checked at a glance.

Hereinafter, a method for detecting an error of the machine 10 by the server 200 based on machine learning will be described in detail.

Figure 3:
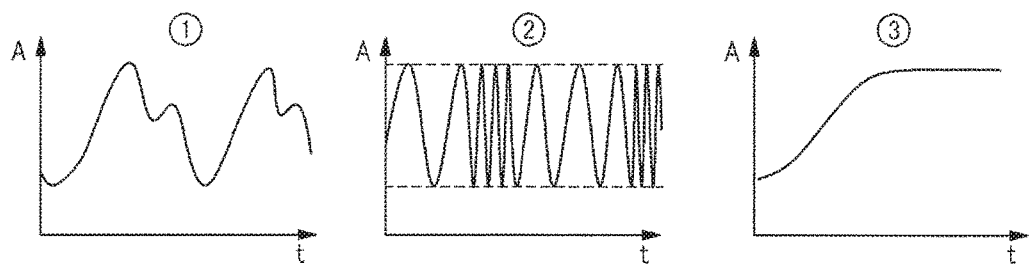
FIG. 3 provides graphs showing three representative types of operation data measured from a machine.

The operation data of the machine 10 can be roughly classified into three representative types as shown in FIG. 3. That is, the operation data of the machine 10 can be classified into operation data having different amplitudes over time and repeated at a specific cycle as shown in a graph ①, operation data having the same amplitude and the same cycle and changed in frequency over time as shown in a graph ②, and operation data to be saturated after a predetermined period of time from an operation of the machine 10 as shown in a graph ③.

According to a conventional method for an error of the machine or a defect of a product, a threshold is input by the operator by hand and if any operation data deviate from the threshold, it is recognized as an error event. In this case, the threshold is an absolute value defined regardless of time. Therefore, the conventional method may be suitable for the case where a threshold for values to be saturated as shown in the graph ③ is set to determine whether an operation is normal. However, in the case where data have different amplitudes or are changed in frequency over time as shown in the graphs ① and ②, an error event cannot be accurately recognized according to the conventional method. Therefore, in the case where the conventional method is applied to the data ①, a threshold as an absolute value is applied only to a predetermined time domain directly related to the production of products among all of the time domains. Accordingly, it is impossible to detect an error event in the other time domains to which the threshold is not applied.

According to an exemplary embodiment of the present disclosure to be described below, regardless of a type of operation data of the machine 10, time-sequential threshold data suitable for a pattern of the operation data are generated on the basis of a machine-learning technique. Thus, it is a method for detecting an error of the machine 10 which can be applied to any type of operation data of the machine 10. Hereinafter, it will be described assuming that the operation data of the machine 10 are of type ①.

Figure 4:
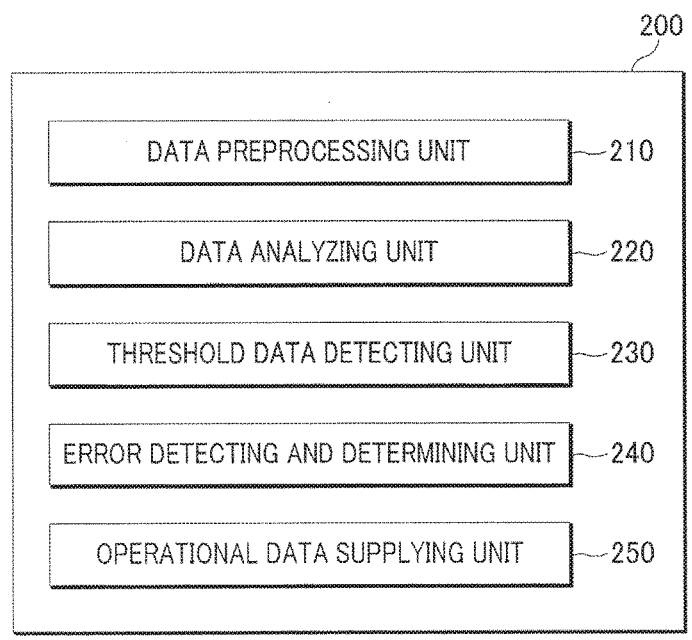
FIG. 4 is a block diagram for a structure of a server in accordance with an exemplary embodiment of the present disclosure.

Referring to FIG. 4, the server 200 may include a memory configured to store a program (or application) for detecting error data of the machine 10 based on a machine-learning technique and a processor configured to execute the program. Herein, the processor may perform various functions upon execution of the program stored in the memory. The components of the processor may include a data preprocessing unit 210, a data analyzing unit 220, a threshold data detecting unit 230, an error detecting and determining unit 240, and an operation data supplying unit 250 suitable for the respective functions.

The data preprocessing unit 210 is configured to collect past and current operation data of the machine 10 and perform w.

Assuming that the operation data of the machine 10 are of type ① in FIG. 3, the operation data are generated in a single pattern whenever the machine 10 manufactures a single object. That is, if the machine 10 manufactures a single object for 60 seconds, the operation data have an identical or similar amplitude (values for temperature, pressure, voltage, etc.) at each 60-second interval. In this case, operation data collected while the machine 10 is operated to manufacture an object are significant data. Thus, data corresponding to a period of time in which the machine 10 is not operated may be excluded and data corresponding to a period of time in which the machine 10 is operated may be collected, and the collected data may be compressed. Accordingly, the preprocessed operation data can be represented as shown in a graph of FIG. 5.

Figure 5:
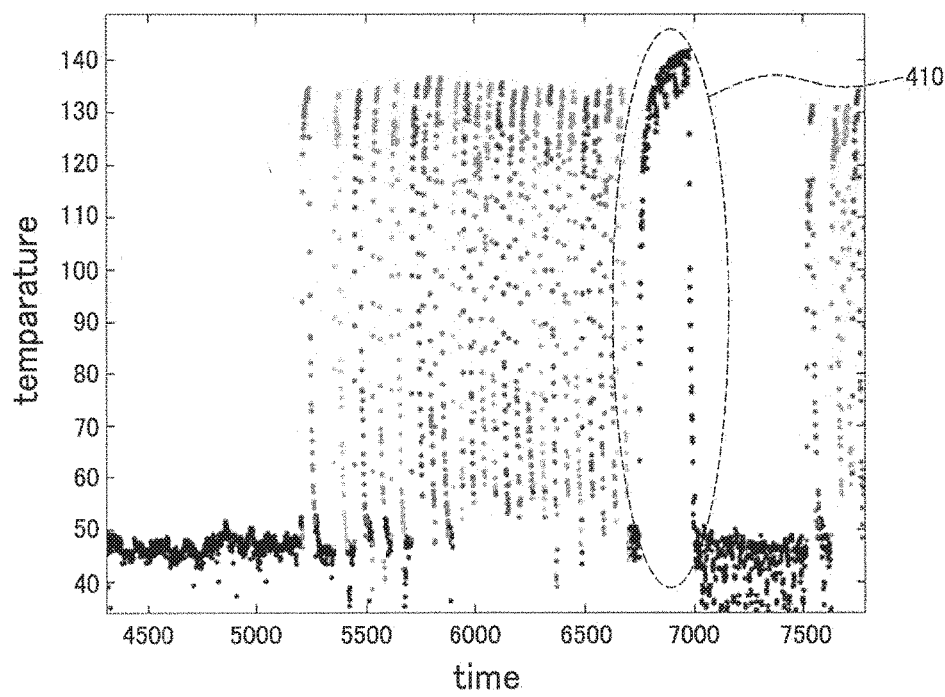
FIG. 5 is a graph of preprocessed operation data in accordance with an exemplary embodiment of the present disclosure.

In this case, event data 410 having a pattern deviating from a pattern of the collected operation data can be detected. Specifically, the event data 410 having a pattern deviating from an average pattern (e.g., graph shape) of the collected operation data can be detected. FIG. 5 illustrates the event data 410 having a much higher amplitude value during a specific time domain than the other operation data.

The event data 410 are about an error of the machine 10 or a defect of the object. Herein, work information (information indicative of whether the machine 10 has encountered an error or the object has a defect) at the moment of detection of the event data 410 is searched on the basis of work data recorded in an actual worksite, and the work information which are matched with the event data 410 may be stored in the server 200. The information to be matched with the event data 410 and then stored may include any one of information indicative of an error of the machine 10 and a defect of the object, information indicative of an error of the machine 10 and normality of the object, information indicative of normality of the machine 10 and a defect of the object, and information indicative of normality of the machine 10 and normality of the object.

The data analyzing unit 220 may perform a machine-learning technique to the preprocessed operation data to derive standard data for the operation data.

Figure 6:
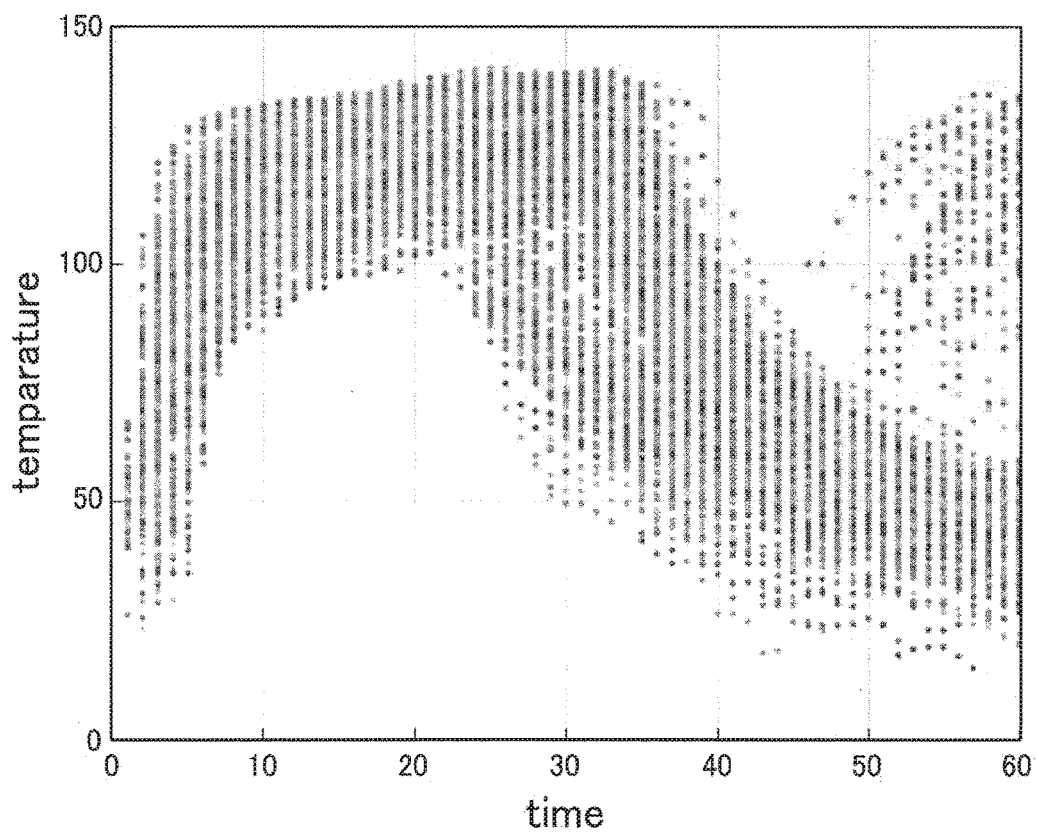
FIG. 6 is a graph in the case where operation data are divided at each 60-second interval and the divided operation data are mapped to be overlapped within a 60-second interval in accordance with an exemplary embodiment of the present disclosure.

Specifically, the data analyzing unit 220 may divide the operation data at a predetermined time interval and map the divided operation data to be overlapped on a time domain having a length corresponding to the predetermined time interval. For example, the predetermined time interval may be a single cycle (e.g., 60 seconds) of the operation data. The single cycle may refer to the time required for the machine 10 to manufacture a single object. The data analyzing unit 220 may divide all of the collected time-sequential operation data at each cycle and map the values constituting the divided operation data on a graph having a length corresponding to the single cycle. In this case, the graph as shown in FIG. 6 may be obtained. That is, all of the dots constituting the divided operation data are mapped on the graph. According to the graph in FIG. 6, it can be seen that the operation data are repeated with a specific pattern and.

Figure 7:
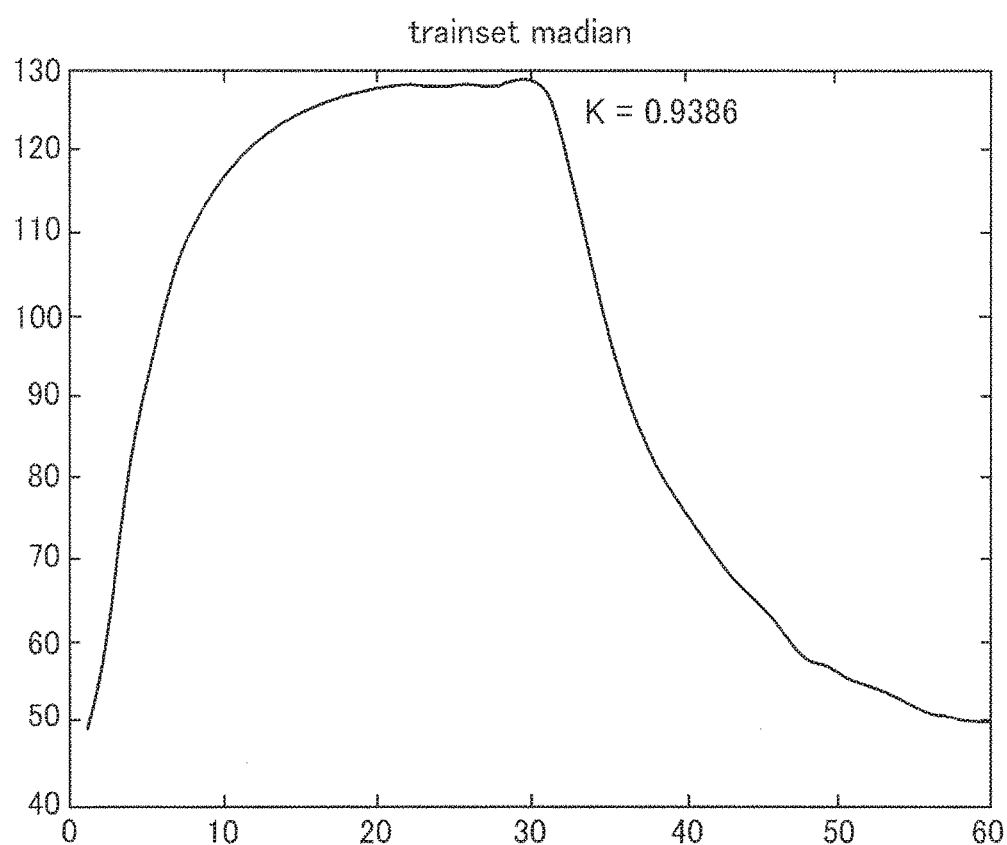
FIG. 7 is a graph of standard data detected from collected operation data on the basis of a machine-learning technique in accordance with an exemplary embodiment of the present disclosure.

The data analyzing unit 220 may extract at least one time-sequential standard datum based on an average value or a median value from a set of the mapped operation data and detect a standard datum having the highest K-index, based on the machine-learning technique. If the data analyzing unit 220 extracts standard data based on a median value, the data analyzing unit 220 may detect the divided operation data which most frequently appear among all the divided operation data overlapped on the graph in FIG. 6, as standard data. Herein, the K-index is a statistical index. As the K-index of a specific graph is closer to 1, the graph is closer to a standard value for operation data. That is, the data analyzing unit 220 performs machine learning while repeatedly detecting standard data for the collected operation data and measuring the K-index, and detects standard datum having the highest K-index. For example, a graph of standard data as shown in FIG. 7 may be obtained.

The threshold data detecting unit 230 may detect time-sequential threshold data based on the standard data. Specifically, the threshold data detecting unit 230 may detect upper threshold data 422 by performing a machine-learning process as performed by the data analyzing unit 220 to operation data having higher Y-axis values (amplitude values) than the standard data among the operation data mapped on the graph in FIG. 6. Further, the threshold data detecting unit 230 may detect lower threshold data 423 by performing the same machine-learning process to operation data having lower Y-axis values (amplitude values) than the standard data among the operation data mapped on the graph in FIG. 6. In this case, a combination of the upper threshold data 422 and the lower threshold data 423 becomes threshold data.

Figure 8:
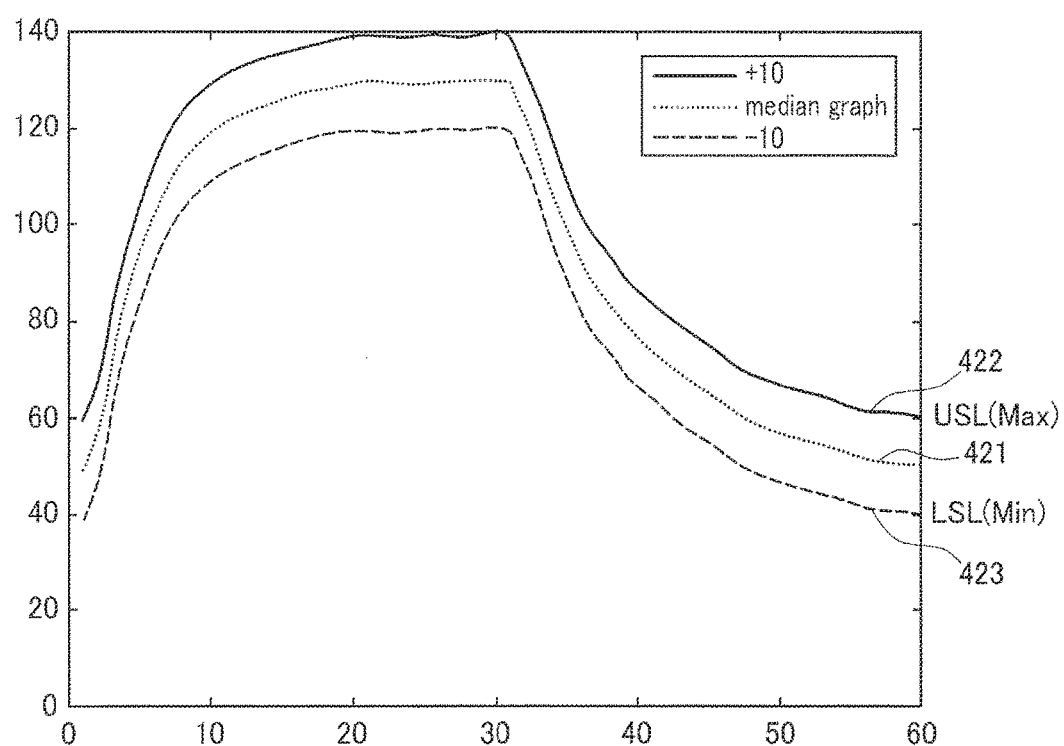
FIG. 8 is a graph of time-sequential threshold data in accordance with an exemplary embodiment of the present disclosure.

Referring to FIG. 8, it can be seen that standard data 421 are mapped between the upper threshold data 422 and the lower threshold data 423. Further, it can be seen that the threshold data are configured to have different values over time. That is, since the operation data are of type ① in FIG. 3, the threshold data derived on the basis of machine learning are also of type ①. Although FIG. 8 illustrates that the upper threshold data 422 and the lower threshold data 423 have a difference of +10 or −10 from the standard data, this is just an example and the upper threshold data 422 and the lower threshold data 423 may be configured to have another difference value.

The error detecting and determining unit 240 may compare operation data collected in real time with the threshold data to detect an error and determine a type of the error.

Figure 9:
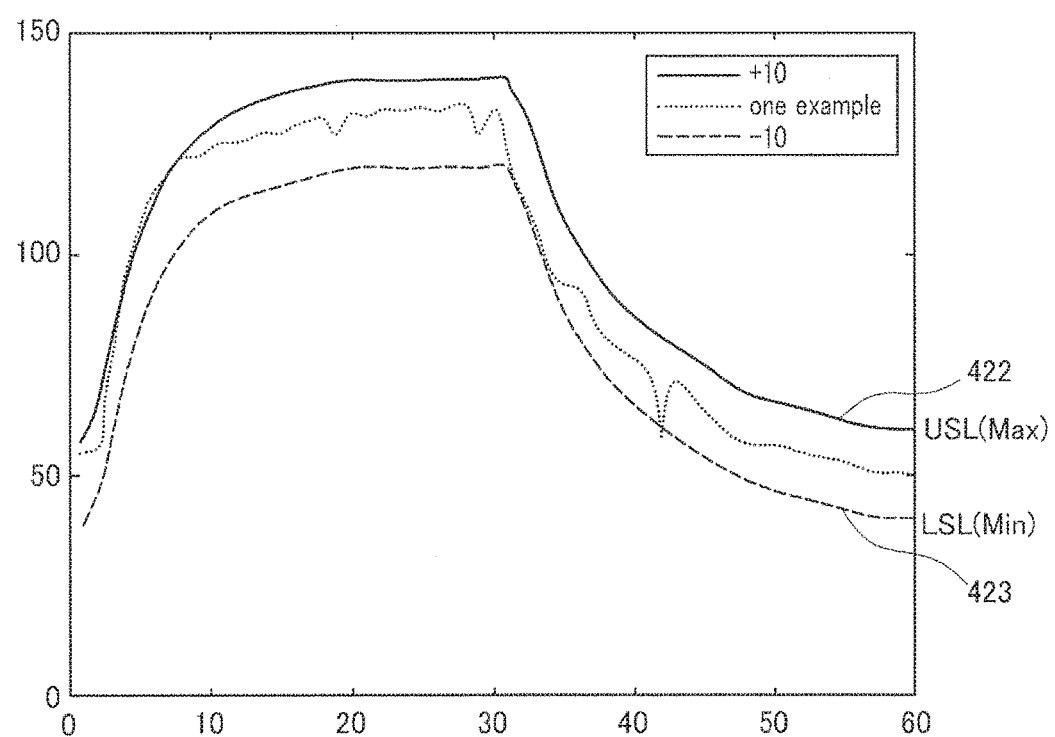
FIG. 9 is a graph in the case where random operation data are input to verify threshold data in accordance with an exemplary embodiment of the present disclosure.

If real-time operation data are configured to be distributed between an upper limit and a lower limit of the threshold data as shown in FIG. 9, the error detecting and determining unit 240 may regard the machine 10 and the object as normal.

Figure 10:
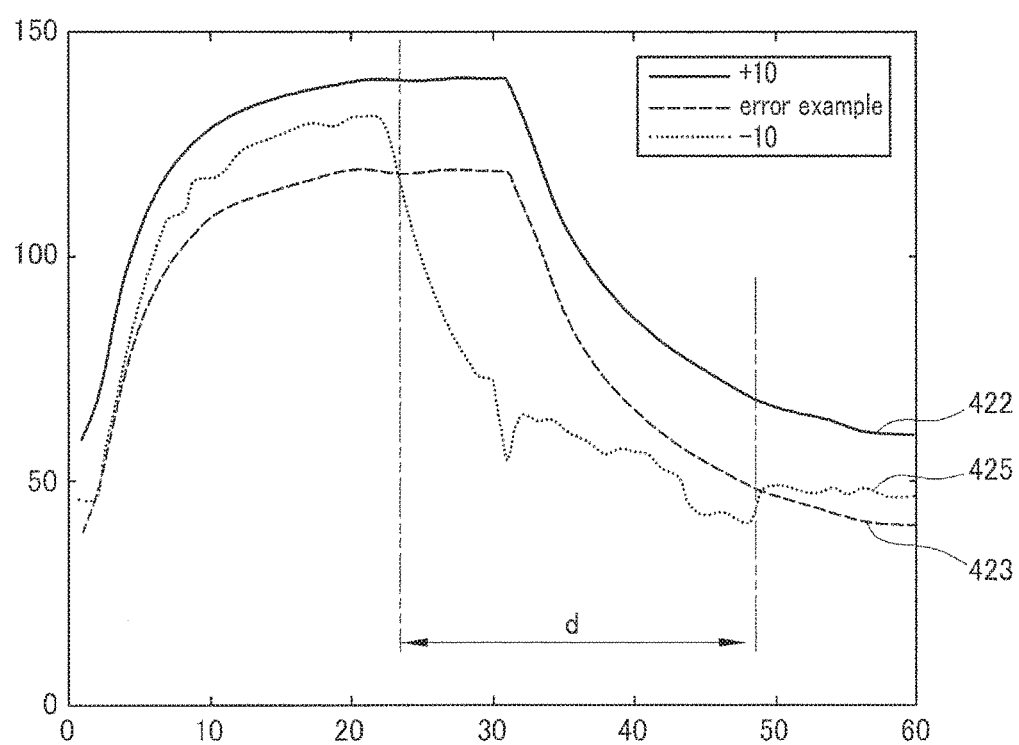
FIG. 10 is a graph in the case where error data are generated in accordance with an exemplary embodiment of the present disclosure.

However, if real-time operation data 425 are configured to deviate from any one of the upper limit or the lower limit in a certain time domain as shown in FIG. 10, the error detecting and determining unit 240 may detect the real-time operation data 425 as error data 425. The error data 425 in FIG. 10 have a normal data pattern until about 25 seconds but have an abnormal pattern deviating from the threshold data in a time domain d between about 25 seconds to about 50 seconds.

Then, the error detecting and determining unit 240 may compare the pattern of the error data 425 with that of the event data 410. According to the result of the comparison, the error detecting and determining unit 240 may determine information indicative of whether the machine 10 has encountered an error or the object has a defect in the event data 410 having the pattern corresponding to the error data 425 as information about the error data 425. That is, the event data 410 may include the above-described four types (information indicative of normality of the machine 10 and normality of the object, information indicative of normality of the machine 10 and a defect of the object, information indicative of an error of the machine 10 and normality of the object, and information indicative of an error of the machine 10 and a defect of the object), and the error detecting and determining unit 240 may determine which of the four types corresponds to the error data 425.

The operation data supplying unit 250 may supply information about the error event to the operator device.

Figure 11:
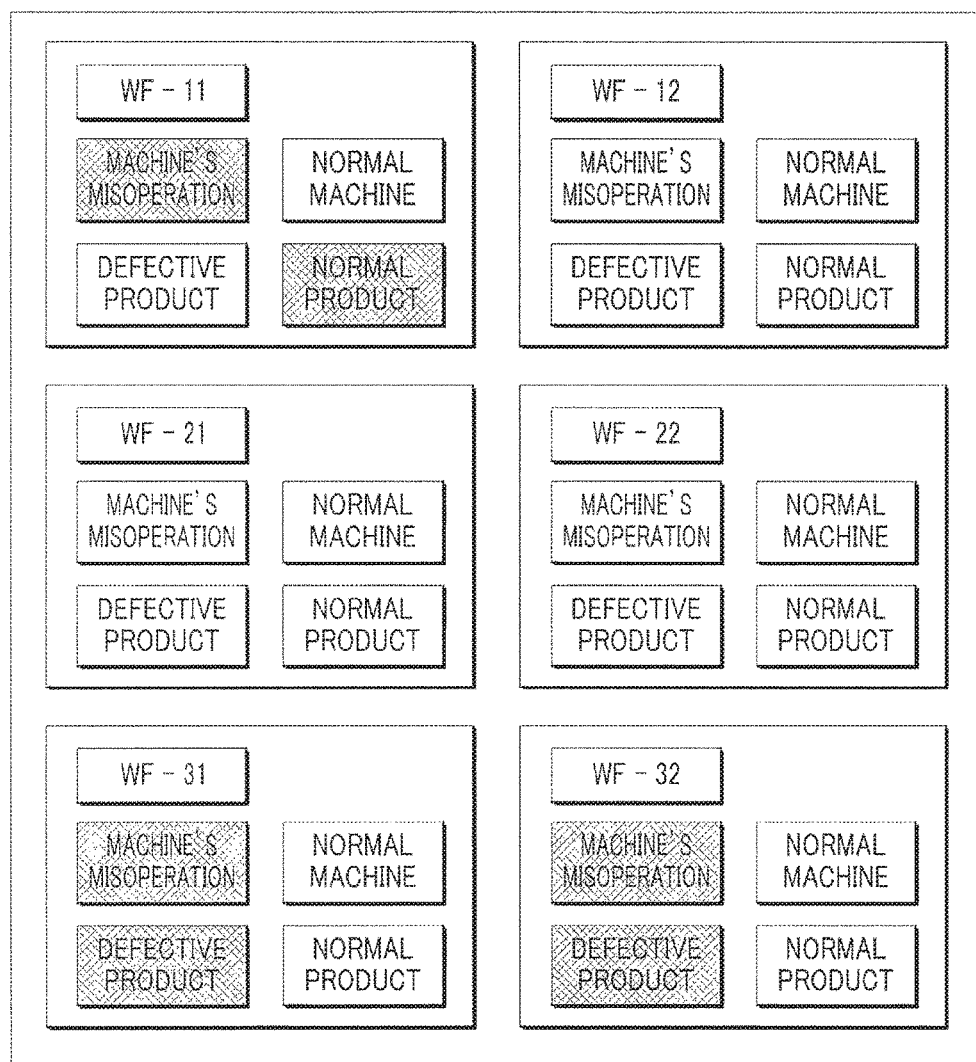
FIG. 11 shows an example of a user interface in accordance with an exemplary embodiment of the present disclosure.

Herein, a user interface supplied to the operator device may be configured as shown in FIG. 11. Specifically, the user interface includes identification information (e.g., WF-11, WF-12, WF-21, WF-22, WF-31, and WF-32 in FIG. 11) of multiple machines 10 included in the worksite and status information of the machines 10 displayed as being respectively matched with the identification information and objects manufactured by the machines 10. That is, each machine 10 is separated as a block and status information thereof may be supplied. As shown in FIG. 11, information about the current status of the machine 10 may be expressed by differentiating status values (machine 10's malfunction, normal machine 10, defective product, and normal product) by color or shade. In an additional exemplary embodiment, the user interface may display a picture of a structure in which multiple machines 10 are arranged and further display identification information and status information of the machines 10 on the picture. Thus, the user interface may supply the operator with the status information of the machines 10 in the form of a map so as to be easily checked at a glance.

Further, if there is an input (touch or click) from the operator on identification information of any one of the machines 10 through the user interface, information about multiple time-sequential operation data of the machine 10 collected in real time may be supplied. For example, a graph of the real-time temperature, humidity, and pressure of the machine 10 may be supplied.

Furthermore, if the real-time graph is magnified, the user interface may supply the operator with a graph of real-time operation data and a graph of the threshold data which are displayed as being overlapped with each other.

Meanwhile, even after the threshold data are generated via the above-described machine learning and big data analysis, operation data are continuously collected and accumulated. Thus, by performing the same machine learning and big data analysis again to operation data including the operation data collected and accumulated thereafter, the threshold data can be updated.

Figure 12:
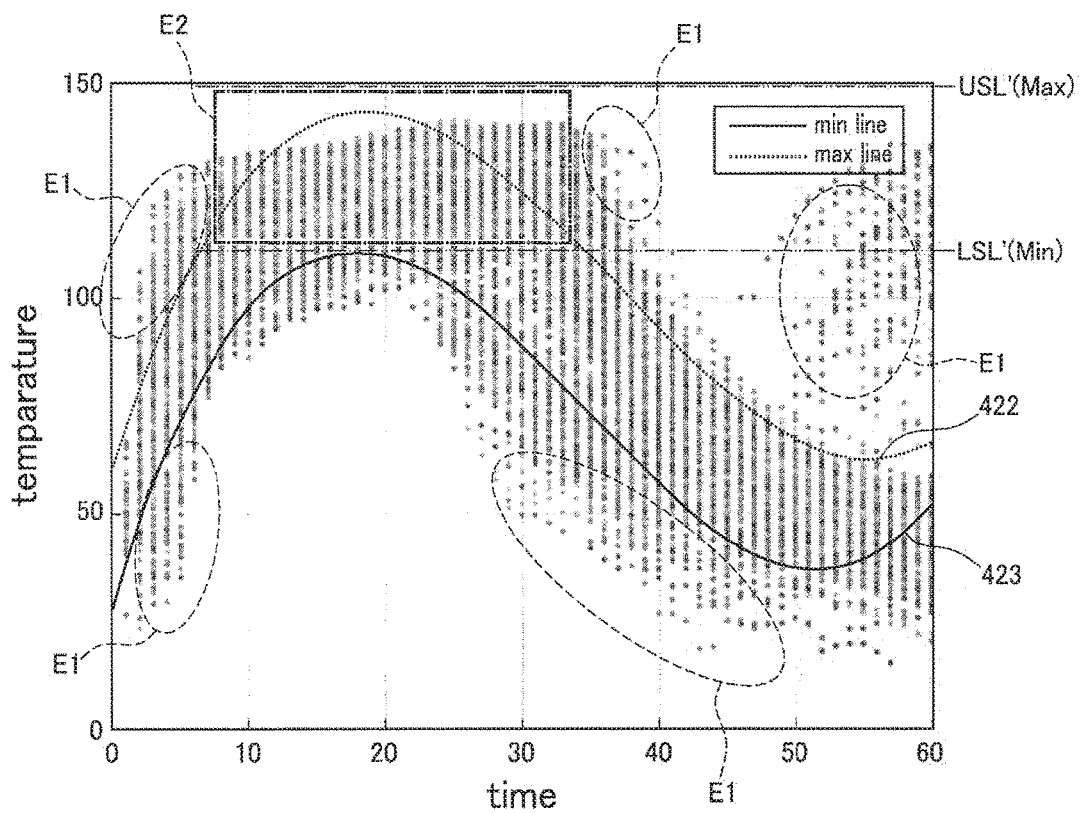
FIG. 12 is a graph for comparison of threshold data in accordance with an exemplary embodiment of the present disclosure and a conventional technology.

Referring to FIG. 12, threshold data set by the operator according to the conventional technology are defined as absolute values such as upper spec limit (USL) and lower spec limit (LSL). In this case, the determination of an error can only be made to operation data within a range of from about 10 seconds to about 30 seconds. That is, the determination of an error of the machine 10 or a defect of a product can only be made to an area E2 in FIG. 12. However, according to an exemplary embodiment of the present disclosure, the threshold data include the upper threshold data 422 and the lower threshold data 423 which are time-sequentially changed. Therefore, error data can be detected from an area E1 from which error data cannot be detected according to the conventional technology.

Figure 13:
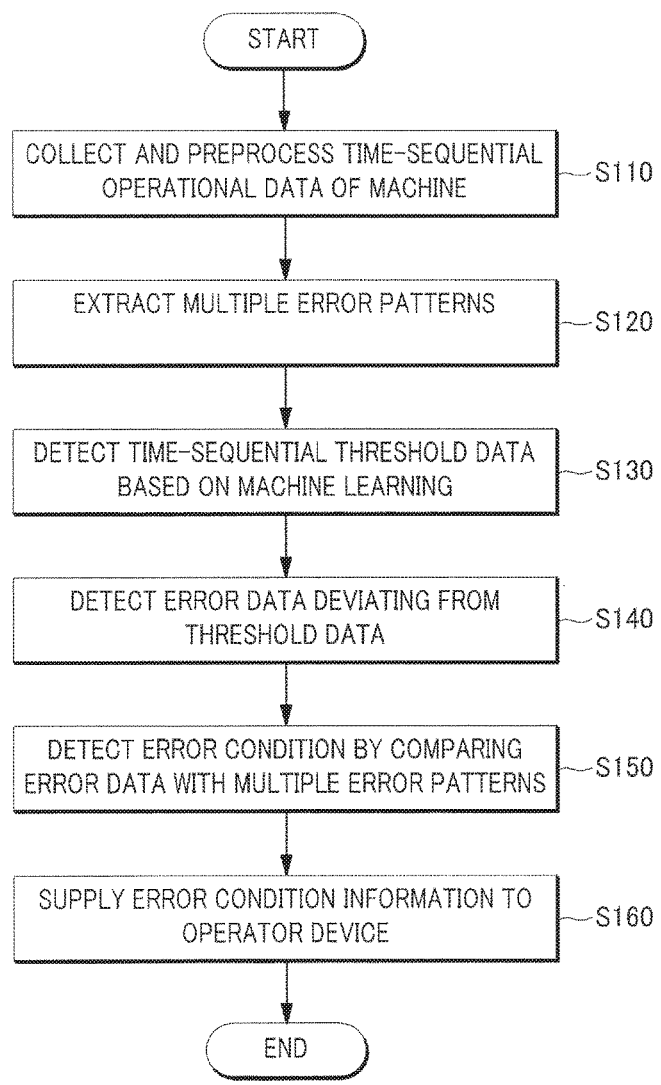
FIG. 13 is a flowchart provided to explain a method for detecting error data of a machine based on a machine-learning technique in accordance with an exemplary embodiment of the present disclosure.

Hereinafter, the method for detecting an error of the machine 10 based on machine learning according to an exemplary embodiment of the present disclosure will be described in detail with reference to FIG. 13. The following method is performed by the above-described server 200. Therefore, the above descriptions may be applied to the following method, even though they are omitted hereinafter.

The server 200 may collect time-sequential operation data of the machine 10 and perform a preprocess thereto (S110).

The server 200 may extract multiple error patterns from the preprocessed operation data (S120). If there is a pattern deviating from an average pattern of operation data, the server 200 may detect the pattern as an error pattern. Then, the server 200 may match each error pattern with information on a workbook to determine whether the error pattern is indicative of an error of the machined 10 or a defect of an object.

Then, the server 200 may detect time-sequential threshold data from all of the operation data collected on the basis of a machine-learning technique (S130). The server 200 may detect a standard datum having the highest K-index and detect the threshold data based on the standard datum.

The server 200 may detect error data deviating from the threshold data (S140).

In this case, the server 200 may detect an error condition by comparing the error data with the multiple error patterns (S150). That is, the server 200 may detect an error condition by comparing the error data with the previously detected event data 410.

The server 200 may supply error condition information to the worker device depending on a preset user interface (S160).

The embodiment of the present disclosure can be embodied in a storage medium including instruction codes executable by a computer such as a program module executed by the computer. Besides, the data structure in accordance with the embodiment of the present disclosure can be stored in the storage medium executable by the computer. A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data.

The system and method of the present disclosure has been explained in relation to a specific embodiment, but its components or a part or all of its operations can be embodied by using a computer system having general-purpose hardware architecture.

The above description of the present disclosure is provided for the purpose of illustration, and it would be understood by those skilled in the art of the related field that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A method for detecting error data of a machine based on a machine-learning technique, by a server, comprising:
   (a) collecting time-sequential operation data of at least one machine;
   (b) dividing the operation data at a predetermined time interval and mapping the divided operation data to be overlapped on the same time domain;
   (c) generating time-sequential threshold data by deriving time-sequential standard data for a set of the mapped operation data based on a machine-learning technique; and
   (d) if the time-sequential operation data collected in real time deviate from the time-sequential threshold data, determining the time-sequential operation data as an error event and supplying information about the error event to an operator device,
   wherein the process (b) includes dividing the collected operation data by designating a single cycle of the operation data as the predetermined time interval, and mapping the divided operation data on the time domain having a length corresponding to the single cycle, and
   wherein the single cycle of the operation data is the time required for the machine to manufacture a single object.

2. The method for detecting error data of a machine based on a machine-learning technique of claim 1,
   wherein the process (a) includes:
   collecting the time-sequential operation data when the machine is operated to perform a process of manufacturing a predetermined object.

3. The method for detecting error data of a machine based on a machine-learning technique of claim 1,
   wherein the process (a) includes:
   detecting event data having a pattern deviating from a pattern of the collected operation data; and
   storing the event data as being matched with information indicative of whether the machine has encountered an error or an object manufactured by the machine has a defect.

4. The method for detecting error data of a machine based on a machine-learning technique of claim 3,
   wherein the information stored as being matched with the event data is any one of information indicative of an error of the machine and a defect of the object, information indicative of an error of the machine and normality of the object, and information indicative of normality of the machine and a defect of the object.

5. The method for detecting error data of a machine based on a machine-learning technique of claim 4,
   wherein the process (d) includes:
   if error data deviating from the threshold data are detected at a certain time point from the operation data collected in real time, comparing a pattern of the error data with the pattern of the event data; and
   according to the result of the comparison, supplying the operator device with information indicative of whether the machine has encountered an error or the object has a defect in the event data having the pattern corresponding to the error data as information about the error data.

6. The method for detecting error data of a machine based on a machine-learning technique of claim 1,
   wherein the process (c) includes:
   (c-1) extracting at least one time-sequential standard datum based on a median value from a set of the mapped operation data using the machine-learning technique.

7. The method for detecting error data of a machine based on a machine-learning technique of claim 6,
   wherein the process (c) includes:
   (c-2) after the process (c-1), detecting upper threshold data by performing the process c-1) to operation data having higher values than the standard data among the mapped operation data; and (c-3) detecting lower threshold data by performing the process c-1 to operation data having lower values than the standard data among the mapped operation data.

8. The method for detecting error data of a machine based on a machine-learning technique of claim 7,
wherein the standard data include values between the upper threshold data and the lower threshold data, and
the time-sequential threshold data are configured as a combination of the upper threshold data and the lower threshold data and configured to have different values over time.

9. The method for detecting error data of a machine based on a machine-learning technique of claim 1,
wherein a user interface supplied to the operator device includes:
identification information of multiple machines included in a worksite;
status information of the machines displayed as being respectively matched with the identification information and objects manufactured by the machines; and
information about error data of the machines and the objects are supplied as the status information if the error data are generated.

10. The method for detecting error data of a machine based on a machine-learning technique of claim 9,
wherein the status information includes:
a status about normality of a machines and normality of an objects, a status about normality of a machines and a defect of an object, a status about an error of a machine and normality of an object, and a status about an error of a machine and an error of an object.

11. The method for detecting error data of a machine based on a machine-learning technique of claim 10,
wherein if there is an input from the operator on identification information of any one of the machines through the user interface, information about multiple time-sequential operation data of the machine collected in real time is supplied.

12. The method for detecting error data of a machine based on a machine-learning technique of claim 1,
wherein the time-sequential threshold data are updated as the operation data are collected and accumulated in real time.

13. The method for detecting error data of a machine based on a machine-learning technique of claim 1,
wherein a user interface supplied to the operator device includes:
a graph of time-sequential operation data collected in real time and the threshold data which are displayed as being overlapped on the graph.

14. A non-transitory computer-readable storage medium that stores a computer program configured to perform a method for detecting error data of a machine based on a machine-learning technique of claim 1.

15. A server configured to detect error data of a machine based on a machine-learning technique, comprising:
a memory that stores a program configured to detect the error data of the machine based on the machine-learning technique; and
a processor configured to execute the program,
wherein upon execution of the program, the processor collects time-sequential operation data of at least one machine,
divides the operation data at a predetermined time interval which corresponds to a single cycle of the operation data and maps the divided operation data to be overlapped on the same time domain having a length corresponding to the single cycle, wherein the single cycle of the operation data is the time required for the machine to manufacture a single object,
generates time-sequential threshold data by deriving time-sequential standard data for a set of the mapped operation data based on the machine-learning technique, and
if the time-sequential operation data collected in real time deviate from the time-sequential threshold data, determines the time-sequential operation data as an error event and supplies information about the error event to an operator device.

* * * * *

UNITED STATES PATENT AND TRADEMARK OFFICE
CERTIFICATE OF CORRECTION

PATENT NO. : 10,366,348 B2
APPLICATION NO. : 15/703644
DATED : July 30, 2019
INVENTOR(S) : Hak Ju Kang It is certified that error appears in the above-identified patent and that said Letters Patent is hereby corrected as shown below:

In the Claims

In Claim 7, Column 12, Line 65, delete "c-1)" and insert --(c-1)--
In Claim 7, Column 13, Line 2, delete "c-1" and insert --(c-1)--

Signed and Sealed this
Twenty-fourth Day of September, 2019

Andrei Iancu
*Director of the United States Patent and Trademark Office*